(12) United States Patent
Sivley, IV et al.

(10) Patent No.: US 8,177,262 B2
(45) Date of Patent: May 15, 2012

(54) MID-SEAL FOR EXPANDABLE CONNECTIONS

(75) Inventors: Robert S. Sivley, IV, Kingwood, TX (US); Gary W. Ward, Conroe, TX (US); Harris A. Reynolds, Jr., Houston, TX (US)

(73) Assignee: Hydril Company LP, Houston, TX (US)

( * ) Notice: Subject to any disclaimer, the term of this patent is extended or adjusted under 35 U.S.C. 154(b) by 1574 days.

(21) Appl. No.: 11/191,547

(22) Filed: Jul. 28, 2005

(65) Prior Publication Data

US 2007/0024053 A1 Feb. 1, 2007

(51) Int. Cl.
*F16L 13/14* (2006.01)

(52) U.S. Cl. .................. 285/334; 285/382.2; 285/382.4

(58) Field of Classification Search .................. 285/333, 285/334, 355, 390, 382, 382.1, 382.2, 382.4, 285/382.5
See application file for complete search history.

(56) References Cited

U.S. PATENT DOCUMENTS

| 2,992,019 | A | | 7/1961 | MacArthur |
| RE30,647 | E | | 6/1981 | Blose |
| 4,611,838 | A | * | 9/1986 | Heilmann et al. ............ 285/331 |
| 4,662,659 | A | | 5/1987 | Blose |
| 4,671,544 | A | * | 6/1987 | Ortloff .......................... 285/334 |
| 4,688,832 | A | | 8/1987 | Ortloff |
| 4,703,954 | A | | 11/1987 | Ortloff |
| 4,753,460 | A | | 6/1988 | Tung |
| 4,796,928 | A | | 1/1989 | Carlin et al. |
| 4,838,068 | A | | 6/1989 | Carlin et al. |
| 4,928,999 | A | * | 5/1990 | Landriault et al. ............ 285/113 |
| 4,958,862 | A | * | 9/1990 | Cappelli et al. ............... 285/334 |
| RE34,467 | E | | 12/1993 | Reeves |
| 5,360,239 | A | | 11/1994 | Klementich |
| 5,415,442 | A | | 5/1995 | Klementich |
| 5,423,579 | A | * | 6/1995 | Blose et al. .................... 285/334 |
| 5,454,605 | A | | 10/1995 | Mott |
| 5,462,315 | A | | 10/1995 | Klementich |

(Continued)

FOREIGN PATENT DOCUMENTS

FR 2852076 A1 9/2004

(Continued)

OTHER PUBLICATIONS

U.S. Appl. No. 11/026,512, filed Dec. 4, 2004.

(Continued)

*Primary Examiner* — Daniel P. Stodola
*Assistant Examiner* — Jay R Ripley
(74) *Attorney, Agent, or Firm* — Osha Liang LLP

(57) ABSTRACT

An expandable tubular connection includes a pin member and a box member. The pin member includes a pin thread formed on a small step and a large step and a first seal surface formed between the small step and the large step. The box member includes a box thread formed on a small step and a large step and a second seal surface formed between the small step and the large step. The pin thread and the box thread are wedge threads. Upon a selected make-up of the pin member with the box member a selected gap exists between the first seal surface and the second seal surface. The gap is selected such that, when plastically radially expanded by a selected amount, a seal is formed between at least a portion of the first seal surface and the second seal surface.

17 Claims, 7 Drawing Sheets

U.S. PATENT DOCUMENTS

| | | | |
|---|---|---|---|
| 5,826,921 A | 10/1998 | Woolley | |
| 5,931,511 A * | 8/1999 | DeLange et al. | 285/334 |
| 6,050,610 A * | 4/2000 | Enderle et al. | 285/94 |
| 6,123,368 A | 9/2000 | Enderle | |
| 6,206,436 B1 | 3/2001 | Mallis | |
| 6,273,474 B1 | 8/2001 | DeLange et al. | |
| 6,409,175 B1 | 6/2002 | Evans et al. | |
| 6,543,816 B1 | 4/2003 | Noel | |
| 6,554,287 B1 | 4/2003 | Sivley | |
| 6,578,880 B2 | 6/2003 | Watts | |
| 6,607,220 B2 | 8/2003 | Sivley, IV | |
| 6,619,696 B2 * | 9/2003 | Baugh et al. | 285/92 |
| 6,626,471 B2 | 9/2003 | Mallis | |
| 6,712,401 B2 * | 3/2004 | Coulon et al. | 285/331 |
| 6,722,706 B2 | 4/2004 | Church | |
| 6,832,789 B2 * | 12/2004 | Church | 285/333 |
| 7,086,669 B2 * | 8/2006 | Evans et al. | 285/382.2 |
| 2002/0027363 A1 | 3/2002 | Mallis et al. | |
| 2004/0017081 A1* | 1/2004 | Simpson et al. | 285/333 |
| 2004/0090068 A1 | 5/2004 | Evans et al. | |
| 2005/0172472 A1 | 8/2005 | Verger et al. | |

FOREIGN PATENT DOCUMENTS

| | | |
|---|---|---|
| FR | 2855587 A1 | 12/2004 |
| JP | H04-29915 | 5/1992 |
| JP | 2003-512588 T | 4/2003 |
| JP | 2006-527092 T | 11/2006 |
| WO | 84/04352 A1 | 11/1984 |
| WO | 2004/079246 A1 | 9/2004 |

OTHER PUBLICATIONS

U.S. Appl. No. 10/973,937, filed Oct. 26, 2004.
PCT Notification of Transmittal of ISR & WO; Int'l Search Report and Written Opinion Issued on corresponding PCT Application No. PCT/US2006/028792; Dated Dec. 21, 2006; 10 pages.
Office Action issued in corresponding European Patent Application No. 06 788 388.4; Dated Nov. 4, 2010 (5 pages).
Notification of Reason(s) for Rejection issued in corresponding Japanese Patent Application No. 2008-524051 with English Translation; Dated Nov. 24, 2010 (7 pages).
Examination Report issued in corresponding Canadian Patent Application No. 2,616,175; Dated May 5, 2011 (4 pages).
Office Action issued in related Canadian Patent Application No. 2,616,175; dated May 27, 2010 (3 pages).
Second Office Action cited in corresponding Chinese application No. 200680027733.8 dated Mar. 25, 2010. 2 pages.
Supplementary Search Report in corresponding PCT application # 06788388.4 dated Dec. 18, 2009. (6 pages).

* cited by examiner

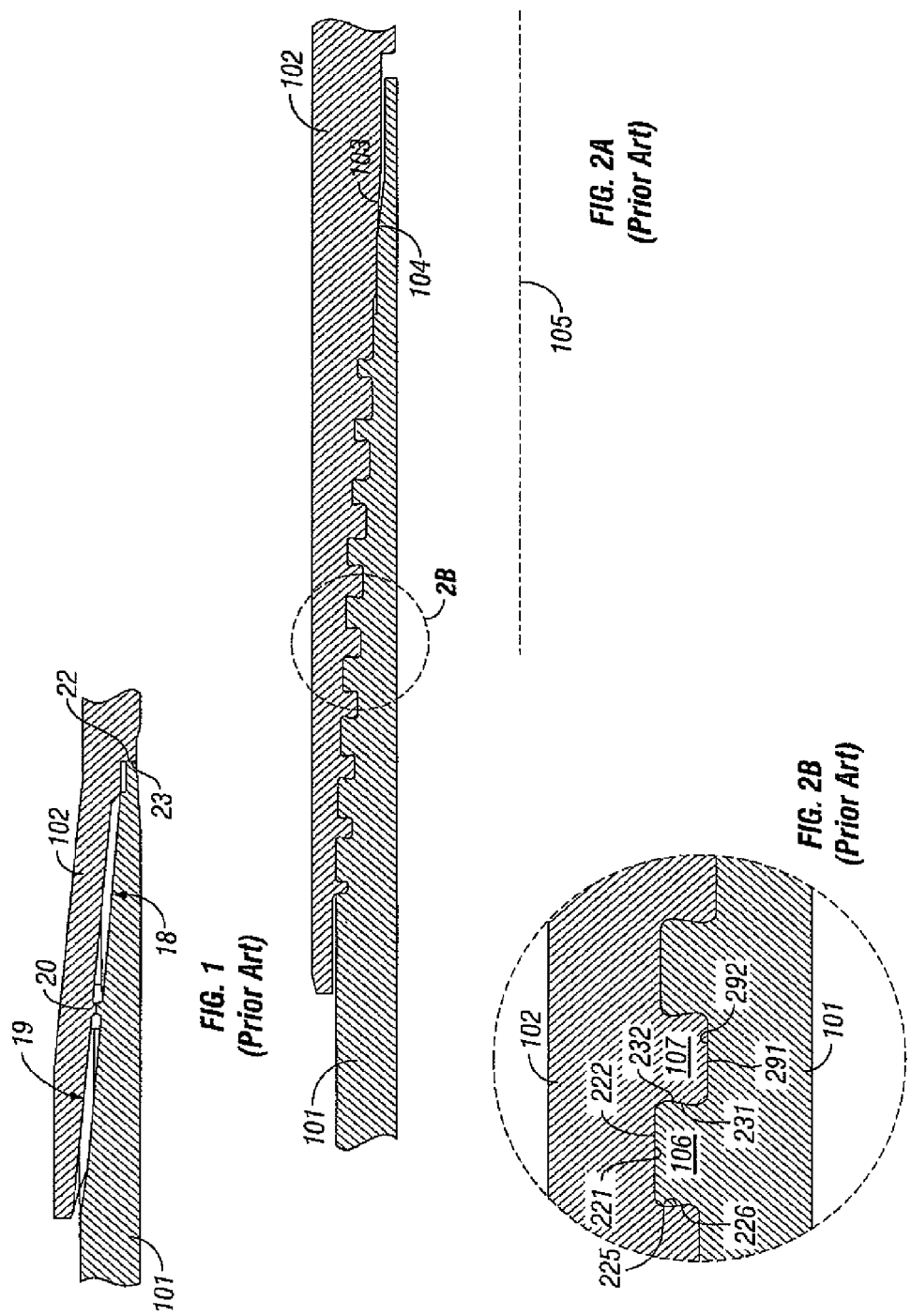

MID-SEAL FOR EXPANDABLE CONNECTIONS

BACKGROUND OF INVENTION

Casing joints, liners, and other oilfield tubulars are often used in drilling, completing, and producing a well. Casing joints, for example, may be placed in a wellbore to stabilize a formation and protect a formation against high wellbore pressures (e.g., wellbore pressures that exceed a formation pressure) that could damage the formation. Casing joints are sections of steel pipe, which may be coupled in an end-to-end manner by threaded connections, welded connections, and other connections known in the art. The connections are usually designed so that a seal is formed between an interior of the coupled casing joints and an annular space formed between exterior walls of the casing joints and walls of the wellbore. The seal may be, for example, an elastomer seal (e.g., an o-ring seal), a thread seal, a metal-to-metal seal formed proximate the connection, or similar seals known in the art.

In FIG. 1, a connection having a metal-to-metal seal at an intermediate position is shown. Such a connection is disclosed as an embodiment of U.S. Pat. No. 6,543,816 issued to Noel. That patent is incorporated herein by reference in its entirety. The connection includes a pin member 101 and a box member 102, each with a single tapered thread, 18 and 19 respectively. The pin thread 18 and the box thread 19 are interrupted at an intermediate position to form corresponding seal surfaces, which form a metal-to-metal seal 20 when a sufficient contact pressure exists therebetween. The metal-to-metal seal 20 shown in FIG. 1 is commonly referred to as a "mid-seal" due to its intermediate position, as opposed to other types of metal-to-metal seals located on the end of the pin member or the box member. To ensure that the desired contact pressure exists to form metal-to-metal seal 20, a positive stop is provided by pin nose 23 on the pin member 101 and shoulder 22 on the box member 102.

One type of thread commonly used to form a thread seal is a wedge thread. In FIG. 2, a connection having a wedge thread is shown. "Wedge threads" are characterized by threads, regardless of a particular thread form, that increase in width (i.e., axial distance between load flanks 225 and 226 and stab flanks 232 and 231) in opposite directions on the pin member 101 and box member 102. The rate at which the threads change in width along the connection is defined by a variable commonly known as a "wedge ratio." As used herein, "wedge ratio," although technically not a ratio, refers to the difference between the stab flank lead and the load flank lead, which causes the threads to vary width along the connection. A detailed discussion of wedge ratios is provided in U.S. Pat. No. 6,206,436 issued to Mallis, and assigned to the assignee of the present invention. That patent is incorporated herein by reference in its entirety.

Wedge threads are extensively disclosed in U.S. Pat. No. RE 30,647 issued to Blose, U.S. Pat. No. RE 34,467 issued to Reeves, U.S. Pat. No. 4,703,954 issued to Ortloff, and U.S. Pat. No. 5,454,605 issued to Mott, all assigned to the assignee of the present invention and incorporated herein by reference. Continuing with FIG. 2, on the pin member 101, the pin thread crest 222 is narrow towards the distal end of the pin member 101 while the box thread crest 291 is wide. Moving along the axis 105 (from right to left), the pin thread crest 222 widens while the box thread crest 291 narrows. In FIG. 1, the thread surfaces are tapered, meaning that the pin thread 106 increases in diameter from beginning to end while the box thread 107 decreases in diameter in a complimentary manner. Having a thread taper improves the ability to stab the pin member 101 into the box member 102 and distributes stress in the connection.

Generally, thread seals are difficult to achieve with non-wedge threads having broad crests and roots, however, the same thread forms may have thread seals when used for wedge threads. Wedge threads do not have any particular thread form. One example of a suitable thread form is a semi-dovetailed thread form disclosed in U.S. Pat. No. 5,360,239 issued to Klementich, and incorporated herein by reference. Another thread form includes a multi-faceted load flank or stab flank, as disclosed in U.S. Pat. No. 6,722,706 issued to Church, and incorporated herein by reference. Each of the above thread forms is considered to be a "trapped" thread form, meaning that at least a portion of the corresponding load flanks and/or corresponding stab flanks axially overlap. An open (i.e. not trapped) thread form with a generally rectangular shape is disclosed in U.S. Pat. No. 6,578,880 issued to Watts. The above thread forms are examples of thread forms that may be used for embodiments of the invention. Generally, open thread forms such as buttress or stub acme are not suitable for wedge threads because they would impart a large radial force on the box member. A generally square thread form, such as that disclosed by Watts, or a trapped thread form does not impart an outward radial force on the box member. Those having ordinary skill in the art will appreciate that the teachings contained herein are not limited to particular thread forms.

For wedge threads, a thread seal is accomplished by the contact pressure caused by interference over at least a portion of the connection between the pin load flank 226 and the box load flank 225 and between the pin stab flank 232 and the box stab flank 231, which occurs when the connection is made-up. Close proximity or interference between the roots 292 and 221 and crests 222 and 291 completes the thread seal when it occurs over at least a portion of where the flank interference occurs. Generally, higher pressure may be contained with increased interference between the roots and crests ("root/crest interference") on the pin member 101 and the box member 102 and by increasing flank interference. This particular connection also includes a metal-to-metal seal that is accomplished by contact pressure between corresponding seal surfaces 103 and 104, respectively located on the pin member 101 and box member 102.

Wedge threads typically do not have a positive stop torque shoulder on the connection. For wedge threads that do not have a positive stop torque shoulder, the make-up is "indeterminate," and, as a result, the relative position of the pin member and box member varies more during make-up for a given torque range to be applied than for connections having a positive stop torque shoulder. As used herein, "make-up" refers to threading a pin member and a box member together. "Selected make-up" refers to threading the pin member and the box member together with a desired amount of torque, or based on a relative position (axial or circumferential) of the pin member with the box member. For wedge threads that are designed to have both flank interference and root/crest interference at a selected make-up, both the flank interference and root/crest interference increase as the connection is made-up (i.e. increase in torque increases flank interference and root/crest interference). For wedge threads that are designed to have root/crest clearance, the clearance decreases as the connection is made-up. Regardless of the design of the wedge thread, corresponding flanks and corresponding roots and crests come closer to each other (i.e. clearance decreases or interference increases) during make-up. Indeterminate make-up allows for the flank interference and root/crest interference to be increased by increasing the make-up torque on the connection. Thus, a wedge thread may be able to thread-seal higher pressures of gas and/or liquid by designing the connection to have more flank interference and/or root/crest interference or by increasing the make-up torque on the connection, however, this also increases stress on the connection during make-up, which could lead to failure during use.

In some well construction operations, it is advantageous to radially plastically expand threaded pipe or casing joints in a drilled ("open") hole or inside a cased wellbore. Radially plastically expanding a pipe, as used in this application, describes a permanent expansion, or increase, of the inside diameter of a pipe or casing. In a cased wellbore, radially expandable casing can be used to reinforce worn or damaged casing so as to, for example, increase a burst rating of the old casing, thereby preventing premature abandonment of the hole. In open hole sections of the wellbore, the use of radially expandable casing may reduce a required diameter of a drilled hole for a desired final cased hole diameter, and may also reduce a required volume of cement required to fix the casing in wellbore.

An expansion tool is typically used to radially plastically expand a string of casing or tubing disposed inside a wellbore from an initial condition (e.g., from an initial diameter to an expanded condition (e.g., with a larger diameter). One common prior art expansion process, shown in FIG. 3, uses a conically tapered, cold-forming expansion tool (commonly referred to as a "pig") to expand casing in a wellbore. The expansion tool is generally sealed inside of a pig launcher, which is a belled section attached to a lower end of a casing string that is run into the wellbore. Because the pig launcher must usually pass through the parent casing already installed in the wellbore, the pig launcher has an outer diameter that is less than a "drift diameter" of the parent casing. As used herein, the "drift diameter" is the maximum external diameter that can pass through a casing or tubing string disposed in a well. Generally, the drift diameter is somewhat smaller that the internal diameter of the casing or tubing due to the wellbore not being perfectly straight, or eccentricity or damage to the casing or tubing. Because of this, a tool having exactly the internal diameter of the casing or tubing would be unable to move freely through the casing or tubing.

The casing string is set in place in the hole, usually by hanging-off the casing string from a casing hanger. Then, a working string of drillpipe or tubing is run into the wellbore and attached to the expansion tool (e.g., the working string is generally attached to the leading mandrel). After connecting the drill pipe, the weight of the casing string is supported by the expansion tool. The drill pipe is then used to further lower the casing string to the selected location in the wellbore. The expansion tool includes a tapered section having a taper angle that is generally between 5 degrees and 45 degrees. The expansion tool is generally symmetric about a longitudinal axis thereof. The expansion tool also includes a cylindrical section having a diameter that corresponds to a desired expanded inner diameter of a casing string (not shown) that is followed by a tapered section. The expansion tool may also comprise an axial bore therethrough so that cement and pressurized fluid (e.g., drilling fluid) may be pumped through the working string, through the expansion tool, and into the wellbore.

Cement is pumped through the drill pipe and out of a cement port on the pig. The cement flows between the outside of the casing string to be expanded (hereinafter the "expandable casing string") and the inside of the wellbore. After the selected amount of cement has been pumped, the cement port is sealed off, typically by a dart designed to seat in the cement port. The dart is usually pumped with drilling fluid through the drill pipe. Continuing to pump drilling fluid pressurizes the pig launcher, which, combined with an axial upward lifting force on the working string, drives the expansion tool 301 forward (i.e. upward toward the surface). As the expansion tool 301 moves forward, the expandable casing string outwardly radially expands to a desired expanded diameter. Expansion continues until the entire expandable casing string has been expanded. In many instances, the expandable casing string will include a length of casing that remains inside the parent casing after expansion. The extra length of casing can be designed to act as a liner hanger for the expanded casing string and to seal between the parent casing and the expanded casing string.

The expansion tool 301 may be started at either the bottom or the top of the expandable casing string depending on the tool design and the application. Radial expansion may be performed at rates of, for example, 25 to 60 feet per minute. Other expansion processes, such as expansion under localized hydrostatic pressure, or "hydroforming," are known in the art, but are generally not used as much as cold-forming expansion processes. Other expansion tools for cold-forming the casing also exist. Various tools exist for use in cold-forming expansion processes.

While various expansion methods, in particular the tapered expansion tool method, have proven to work quite well on expandable casing strings, the expansion of made-up threaded connections can result in structural sealing problems. Threaded connections that undergo radial plastic expansion have a tendency to exhibit a non-uniform axial elongation and react differently to residual hoop stresses remaining after expansion. Specifically, pin members and box members deform differently during radial expansion. The box member will generally move away from the pin member during radial expansion at locations of high contact stress at make-up, such as seal surfaces for a metal-to-metal seal. This is due in part to the relief, during plastic expansion, of residual stress in the connection that exists from the make-up of the box member with the pin member. This differential displacement phenomenon can result in a loss of preload in axially-engaged seals, making the use of conventional metal-to-metal seals (including, for example, shoulder seals and mid-seals) problematic for plastically radially expanded casing and tubing.

One of the more successful threads for expandable casing applications is the wedge thread. One reason that wedge threads are a suitable for expandable casing applications is that they may not make-up against a radial torque shoulder (i.e. a positive stop), but instead typically make-up by nearly simultaneous contact of thread load flanks and stab flanks. During the expansion process, axial stress in the connection will often cause a radial torque shoulder to fail when the compressive stresses at the shoulder exceed the compressive yield strength of the casing material. The advantages of a wedge thread are independent of the thread form used. When a dovetail-shaped or other closed thread form is used for the wedge thread, the wedge thread will also resist radial forces during and after expansion, which might tend to separate the pin connection from the box connection. An open thread form for the wedge thread may also be used.

Despite the relative success of wedge threads in expandable applications, increased seal reliability of connections following radial expansion is still needed. Designing a sealing arrangement for a connection for the purpose of being radially expanded could provide a more reliable seal by replacing prior art sealing arrangements or providing a redundant sealing arrangement.

SUMMARY OF INVENTION

In one aspect, the present invention relates to an expandable tubular connection including a pin member and a box member. The pin member includes a pin thread formed on a small step and a large step and a first seal surface formed between the small step and the large step. The box member includes a box thread formed on a small step and a large step and a second seal surface formed between the small step and the large step. The pin thread and the box thread are wedge threads. Upon a selected make-up of the pin member with the box member a selected gap exists between the first seal surface and the second seal surface. The gap is selected such that, when plastically radially expanded by a selected amount, a seal is formed between at least a portion of the first seal surface and the second seal surface.

In another aspect, the present invention relates to a method of designing an expandable tubular connection. The method includes selecting a pin member and a box member, each having a small step and a large step with wedge threads formed thereon. The method further includes selecting a first seal surface to form between the small step and the large step of the pin member and selecting a second seal surface to form between the small step and the large step of the box member, wherein the first seal surface and the second seal surface are configured to form a seal at a selected contact pressure. An amount of radial expansion for the expandable tubular connection is selected. The method further includes selecting a gap between the first seal surface and the second seal surface at a selected make-up based at least in part on the selected amount of radial expansion, wherein the gap is selected such that at least the selected contact pressure exists between the first seal surface and the second seal surface after a radial expansion of the expandable tubular connection.

Other aspects and advantages of the invention will be apparent from the following description and the appended claims.

BRIEF DESCRIPTION OF DRAWINGS

FIG. 1 shows a prior art connection having a mid-seal.

FIG. 2 shows a prior art connection having a wedge thread.

DETAILED DESCRIPTION

In one aspect, the present invention provides connections having sealing arrangements that provide a seal after undergoing radial expansion. More specifically, embodiments of the present invention provide corresponding seal surfaces with a selected gap therebetween at a selected make-up, such that a desired minimum contact pressure for forming a seal exists between the corresponding seal surfaces after the connection is radially expanded.

As discussed above, much of the residual stress in a connection resulting from make-up is relieved during radial expansion by portions of the box member moving away from the pin member. That movement is emphasized where residual stress is greatest. One source of residual stress is contact pressure between corresponding seal surfaces of a metal-to-metal seal. The maximum pressure that a metal-to-metal seal is capable of sealing is related to the contact pressure between corresponding seal surfaces. Unfortunately for seal reliability, the relief of the residual stress comes in the form of the corresponding seal surfaces moving away from each other such that the contact pressure is reduced or eliminated, resulting in the loss of sealing ability. As a result, the goal of having a metal-to-metal seal following radial expansion conflicts with having one when the connection is made up.

Figure 8A:
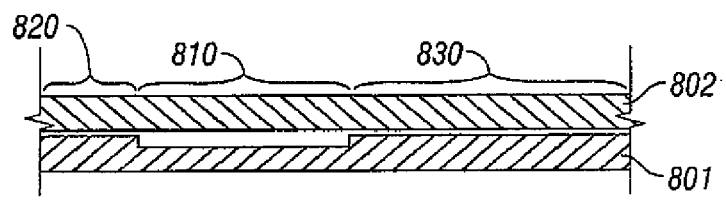
FIG. 8A shows an unexpanded tubular sections.
Figure 8B:
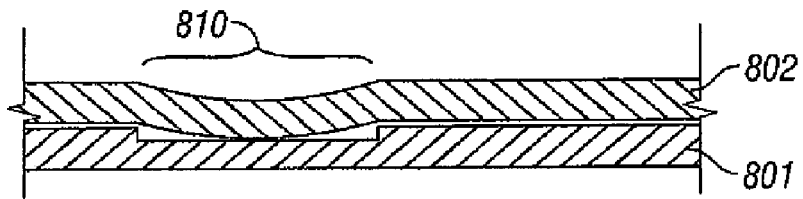
FIG. 8B shows the tubular sections of FIG. 8A after being radially expanded.

Unsupported portions (i.e. not in contact with the pin member) of the box member will have the opposite behavior of areas with high contact stress during radial expansion. FIGS. 8A and 8B demonstrate how an unsupported portion of a box member expands relative to supported portions. In FIG. 8A, an inner cylinder 801 (representing the pin member) is disposed in an outer cylinder 802 (representing the box member). Although all of the outer cylinder 802 radially expands, unsupported portion 810 will expand less relative to the inner cylinder 801 and the adjacent supported portions 820 and 830 of the outer cylinder 802. This occurs because the inner tubular 801 will not push the unsupported portion 810 of the outer tubular 802 radially outward during radial expansion. Instead, the unsupported portion 801 of the outer tubular 802 is pulled radially outward by adjacent supported portions 820 and 830 of the outer tubular as they are forced radially outward by the inner tubular 801 as it is radially expanded from the inside, which causes the unsupported portion 810 of the box member to "sag" relative to the supported portions 820 and 830, as shown in FIG. 8B. As a result, the unsupported portion 810 of the outer tubular 802 not previously in contact with the inner tubular 801 may be come into contact with the inner tubular 801 during radial expansion. Upon coming into contact with the inner tubular 801 with a sufficient contact pressure, the unsupported portion 810 of the outer tubular 802 will continue with any further radial expansion at about the same rate as the inner tubular 801.

The present inventors propose using the expansion differential between supported and unsupported portions to form a metal-to-metal seal in a threaded tubular connection (hereinafter "connection"). To accomplish this, a gap between two corresponding seal surfaces, one on the pin member and one on the box member, is selected such that contact occurs between the corresponding seal surfaces during the radial expansion of the connection. The contact occurs during radial expansion such that, after completion of the radial expansion, a desired contact pressure exists between the corresponding seal surfaces in order to provide a metal-to-metal seal. The desired contact pressure may be determined based on an anticipated pressure that the connection is needed to seal. By using wedge threads and locating the corresponding seal surfaces at intermediate positions, the metal-to-metal seal (hereinafter a "mid-seal") can be designed for different amounts of radial expansion and radial expansion techniques. As used herein, "intermediate position," when used with reference to either the pin member or the box member, refers to a location that has threaded portions of the connection on both sides.

Figure 3:
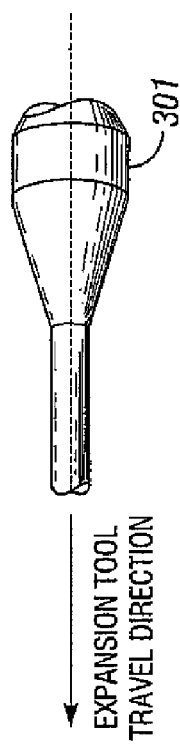
FIG. 3 shows a prior art expansion tool.
Figure 4A:
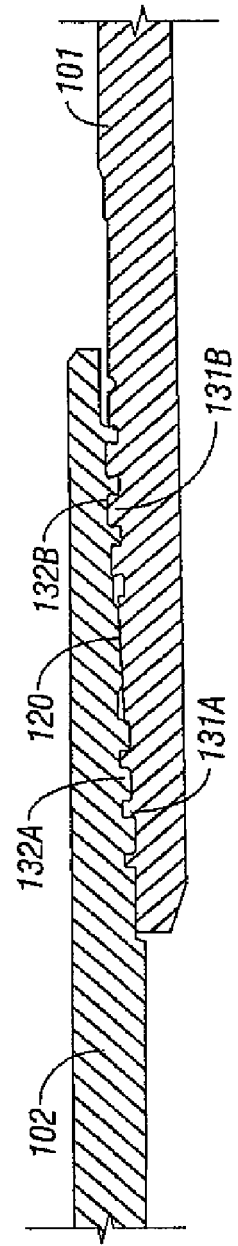
FIG. 4A shows a connection having an expandable mid-seal in accordance with an embodiment of the present invention.
Figure 10:
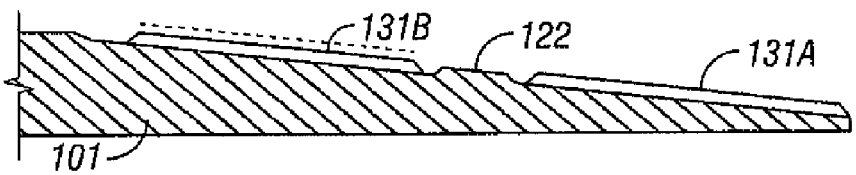
FIG. 10 shows a pin member in accordance with an embodiment of the present invention.

In FIG. 4A, a connection in accordance with an embodiment of the present invention is shown. The connection includes a pin member 101 and a box member 102. The pin member includes two threaded portions 131A and 131B, which make-up to threaded portions 132A and 132B, respectively, on the box member 102. The threaded portions are preferably wedge threads, which allow for the connection to not have a positive stop torque shoulder to make-up the pin member 101 with the box member 102. In this particular embodiment, the threaded portions of the respective members are formed on a single taper, with an interruption to form a mid-seal 120, which is shown in detail in FIG. 4B. Because of the interruption of the threaded portions, the same terminology for two-step connections is used for the purpose of describing embodiments of the present invention. A "small step" refers to the threaded portion having the smaller diameter and a "large step" refers to the threaded portion having the larger diameter. As used herein, a "single taper" means that the small step and the large step are on the same conical surface (i.e. substantially collinear when viewed as a cross-section). The small step and large step may be slightly offset, less than about the height of a thread (offset range is illustrated by the dashed lines above and below threaded portion 131B in FIG. 10), or vary slightly in taper angle and still be a "single taper" as used to describe the present invention. Those having ordinary skill in the art will appreciate that the taper may be measured at any location on the connection, although the taper is typically measured at the roots of each thread pitch. A single taper is preferable when an overall thinner connection is desired. Although the threaded portions 131A, 132A and 131B, 132B are about equal in length, their length may vary without departing from the scope of the present invention.

Figure 4B:
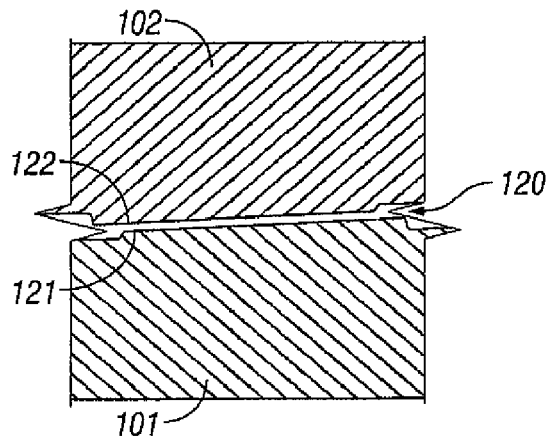
FIG. 4B shows the mid-seal of the connection shown in FIG. 4A before being radially expanded.
Figure 4C:
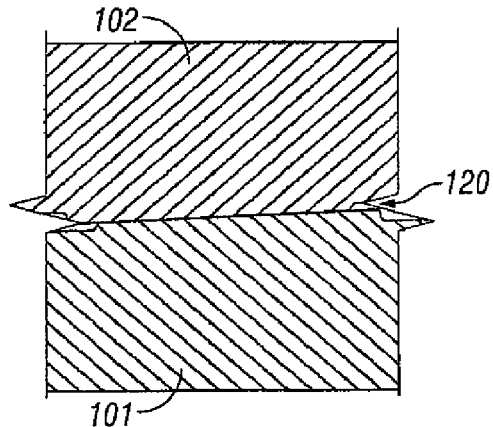
FIG. 4C shows the mid-seal of the connection shown in FIG. 4A after being radially expanded.

Turning to FIGS. 4B and 4C, detailed views of mid-seal 120 from FIG. 4A are shown in accordance with an embodiment of the present invention. FIG. 4B shows the mid-seal 120 at a selected make-up prior to being radially expanded. At the selected make-up, a selected gap is provided between corresponding seal surfaces 121 and 122 on the pin member 101 and the box member 102, respectively. The selected gap prevents the mid-seal 120 from functioning as a seal prior to radial expansion. In this particular embodiment, corresponding seal surfaces 121 and 122 are frustoconical with about the same angles relative to the central axis of the connection. In another embodiment, the corresponding seal surfaces 121 and 122 may have different angles. Generally, and in particular for single tapered embodiments, it is preferable for the angles to be within about 10 degrees of a taper angle of the connection. Following radial expansion, as shown in FIG. 4C, the selected gap disappears, and a selected contact pressure exists between corresponding seal surfaces 121 and 122, thereby providing a mid-seal 120 able to seal pressure across the radially expanded connection.

A goal in selecting the gap between corresponding seal surfaces is to achieve a desired contact pressure upon completion of radial expansion of the connection. Selecting too large of a gap can result in insufficient contact pressure between corresponding seal surfaces, which limits the pressure that the mid-seal is able to seal against. Selecting too little of a gap can cause contact between the corresponding seal surfaces to occur too soon, such that the continued radial expansion of the connection increases the contact pressure between the corresponding seal surfaces to a point that the stress is relieved as if there had been contact pressure at the selected makeup. The gap should be selected such that contact occurs between the corresponding seal surfaces with sufficient radial expansion remaining to build up the desired amount of contact pressure between the corresponding seal surfaces.

The appropriate size of the selected gap depends on several properties of the connection, as well as the amount of radial expansion and the method for the radial expansion. The wall thickness and the axial length of the unsupported portion of the box member, on which the seal surface is formed, between the two threaded portions determines the flexibility of the unsupported portion. A thinner wall and a longer axial length will cause the unsupported to sag relative to the threaded portions (i.e. supported portions) of the box member. Increased flexibility indicates a need for a larger selected gap. There are restrictions on the axial length of the unsupported portion resulting from the connection itself. If the connection has two steps, the axial length may be chosen as desired, except for any restrictions on the overall axial length of the connection. However, a single taper is more restricted because an increase the axial length of the seal surface increases the overall thickness of the connection by either increasing the outer diameter of the box member or decreasing the inner diameter of the pin member. The diametrical constraints in a wellbore make the thickness of the connection much more limited. The increase in the thickness of the connection will, of course, depend on the angle of the taper.

Flexibility of the mid-seal area may also be increased by "clipping" one or more of the adjacent threads. As used herein, "clipping" a thread means making the thread shorter relative to the rest of the threaded portion of which it is a part. The thread may be initially manufactured to be shorter than the rest of the threaded portions, or the crest of the thread may be partially removed afterwards. Clipping a thread results in a gap between the clipped crest and the corresponding root. Whether the pin thread or the box thread is clipped, the effect is substantially the same as long as the clipped thread is adjacent to the mid-seal area. In some connections, the angle of the taper will require that one or more threads be clipped to avoid interference with the seal area during make-up of the connection. The threads to clip for the purpose of avoiding interference are the threads on the large step of the box member, which must pass the seal surface on the pin member, and the threads on the small step of the pin member, which must past the seal surface on the box member. A steeper taper angle relative to the thread height increases the amount of thread that must be clipped to avoid interference. A steeper angle also restricts the axial length of the mid-seal area, which will decrease the flexibility of the mid-seal area. As a result, a steeper angle may also require more than one adjacent thread to be clipped to allow sufficient flexing of the seal area during radial expansion. In one embodiment, the taper angle is about 1 to 15 degrees. In another embodiment, the taper angle is about 3 to 10 degrees. In another embodiment, the taper angle may be about 5 to 7 degrees. Those having ordinary skill in the art will appreciate that one or more advantages of the present invention may be obtained regardless of the taper angle.

The type of thread and the thread form substantially affect the radial expansion of the box member relative to the pin member. As discussed above, areas of high stress tend to be relieved during plastic radial expansion. For example, high make-up torques are often selected to prevent the connection from backing off during use. This causes the threads to be under very high stress. As a result, the tendency is for the box member to try to separate from the pin member during radial expansion. Trapped thread forms, such as dovetailed, semi-dovetailed, and hooked, resist separation of the box member from the pin member as a result of their interlocking shapes. Wedge threads with trapped thread forms have shown particular success in resisting the separation of the box member from the pin member because both the load flanks and the stab flanks are in contact, making wedge threads preferable for one or more embodiments of the present invention. For the integrity of the connection as a whole, and in particular for the ability of the mid-seal to function following radial expansion, resistance to box separation is preferred. Increasing the resistance to separation decreases the size of the selected gap between corresponding seal surfaces.

The expansion method that is used to radially expand the connection is thought to affect the selected gap due to the surplus expansion that results from the expansion method. Surplus expansion results from excess stress imposed on the connection during radial expansion. For radial expansion using a pig, the taper of the pig and the rate at which the pig is pulled through the connection affect the excess stress imposed on the connection. Steeper taper and higher pull rate increase the surplus expansion, while a shallow taper and slow pull rate results in minimal surplus expansion. As used herein, "surplus expansion" is defined by the difference between the OD of the expansion tool and the expanded ID of the tubular. In general, increased surplus expansion increases the size of the selected gap. Another factor that can affect the amount of surplus expansion is the coefficient of friction between the expansion tool and the inner diameter of the connection. When using a pig for the radial expansion, and to a lesser extent a roller-type expansion tool, the coefficient of friction also directly affects the amount of deformation of the pin member in the axial direction relative to the box member. The coefficient of friction is subject to variation based on surface finish of the inner diameter of the pin member and the contacting surfaces of the expansion tool, lubrication provided by fluids in the wellbore, and the mechanical properties of the materials used for the expansion tool and the connection. Because the expansion tool only contacts the pin member, it directly stretches the pin member. Axial deformation occurs in the box member, but that axial deformation is primarily in reaction to the axial deformation of the pin member and to a lesser extent. As a result, in some embodiments the selected gap may have an axial component. Those having ordinary skill any suitable expansion method may be used to radially expand a connection without departing from the scope of the present invention.

The most significant factor in selecting a gap, in particular the radial component thereof, is the amount of radial expansion. The amount of radial expansion is typically quantified by the ratio of the expanded inner diameter of the tubular to the non-expanded nominal diameter of the tubular. That ratio minus one and multiplied by one hundred provides the percentage of radial expansion. The relationship between the selected gap and radial expansion is substantially proportional. For a metal-to-metal seal other than a mid-seal, the selected gap between corresponding seal surfaces may be about 30 to 50 percent of the amount of radial expansion, as disclosed in U.S. Pat. No. 6,554,287 issued to Sivley, IV et al. (hereinafter "Sivley"), and assigned to the assignee of the present invention. That patent is incorporated herein by reference in its entirety. The metal-to-metal seal disclosed by Sivley includes a seal surface on the box member located proximate the distal end of the box member and cantilevered axially over a corresponding seal surface on the pin member. During radial expansion, the cantilevered distal end of the box member collapses (i.e. expands less) relative to pin member, which brings the corresponding seal surfaces into contact thereby creating a metal-to-metal seal.

The metal-to-metal seal disclosed by Sivley is more flexible than the mid-seal in embodiments of the present invention. This is because the mid-seal acts as a pinned beam, while the metal-to-metal seal disclosed by Sivley is cantilevered. Because of the reduced flexibility, the radial component of the selected gap for a mid-seal is generally smaller than the metal-to-metal seal disclosed by Sivley. To compensate for the stiffer mid-seal, the following equation may be used to calculate the radial component of the selected gap:

$$R = \frac{S \times e}{C} + I \qquad \text{Eq. 1}$$

wherein R equals the radial component of the selected gap, S equals the sealing coefficient, e equals the amount of radial expansion, C equals the separation resistance coefficient, and I equals the average amount of root-crest radial interference in the threaded portions.

The value for the sealing coefficient S may be from about 0.3 to 0.5 (i.e. 30 to 50 percent). At 0.3, the corresponding seal surfaces would contact earlier during the radial expansion, resulting in a corresponding higher contact pressure, which determines the amount of pressure that the mid-seal can seal against. A sealing coefficient S much less than 0.3 may result in contact occurring too early in the radial expansion, which may result in the seal surface on the box member expanding away from the seal surface on the pin member. Also, if the sealing coefficient S is much above 0.5, the resulting contact pressure between the corresponding seal surfaces may be insufficient to form a seal. The other factor, besides the pressure to seal against, is the contact area between the corresponding seal surfaces. If the corresponding seal surfaces come into contact over a large area (as opposed to a thin line of contact), a smaller sealing coefficient S may be desirable.

The separation resistance coefficient C corresponds to the resistance of the connection to separation during radial expansion. As shown by the equation, a higher resistance to separation corresponds with a smaller radial component of the selected gap. This property is largely determined by the design of the particular connection and the method of expansion that is used. A wedge thread with a dovetailed thread form is very resistant to thread separation, and would have a separation coefficient C of about 10 to 20. A hooked or semi-dovetailed thread form would have a separation coefficient C of about 5 to 10 depending on the flank angles. An open thread form has the least resistance to separation, giving it a separation coefficient C approaching about 1 from 5. As discussed above, the method of expansion affects the amount of surplus expansion imposed on the connection. The surplus expansion also corresponds to a higher tendency to separate the connection. Accordingly, the separation coefficient C may be increased or decreased depending on the surplus expansion.

Those of ordinary skill in the art will appreciate that experimentally expanding a connection can be used to determine the separation coefficient C. In one embodiment, the selected gap may be about 0.1 to about 0.5 inches. In one or more embodiments, the selected gap may have only a radial component.

Figure 5A:
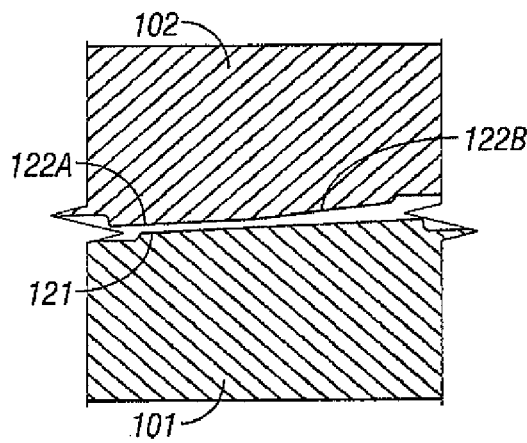
FIG. 5A shows a mid-seal before being radially expanded in accordance with an embodiment of the present invention.
Figure 5B:
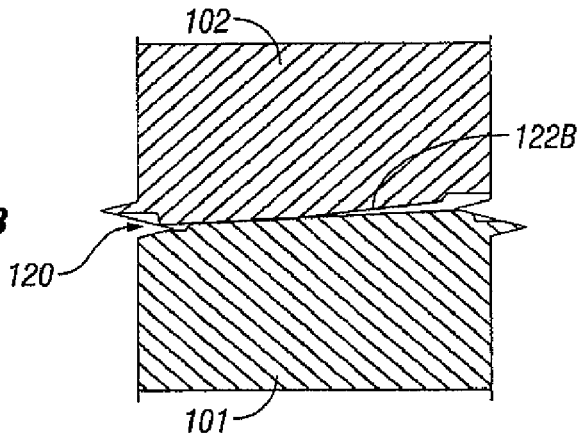
FIG. 5B shows the mid-seal shown in FIG. 5A after being radially expanded.

Turning to FIGS. 5A and 5B, a mid-seal in accordance with an embodiment of the present invention is shown. The seal surface on the box member 102 includes two surfaces, 122A and 122B. Seal surface 122A may be substantially cylindrical, while seal surface 122B is frustoconical, tapering outward from seal surface 122A. The pin member 101 includes a seal surface 121, which may be cylindrical. A selected gap is shown between corresponding seal surfaces 121 and 122A. Because corresponding seal surfaces 121 and 122A are cylindrical, the selected gap does not have an axial component. The same is true if only one of the corresponding seal surfaces 121 and 122A is cylindrical. Also, if the corresponding seal surfaces are frustoconical with the same angle, such as in FIG. 4B, the axial component does not affect when the corresponding seal surfaces 121 and 122 come into contact during radial expansion. FIG. 5B shows the mid-seal from FIG. 5A after being radially expanded. Following radial expansion, corresponding seal surfaces 121 and 122A are in contact with a sufficient contact pressure to seal against hydraulic pressure.

Figure 6B:
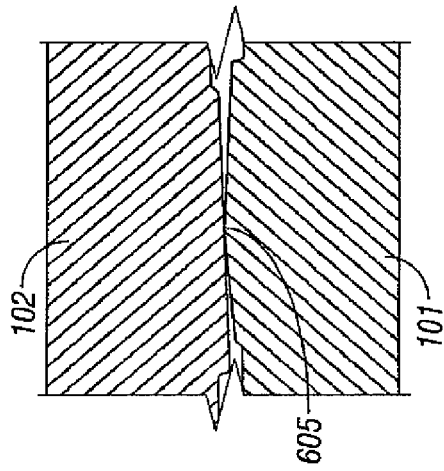
FIG. 6B shows the mid-seal shown in FIG. 6A after being radially expanded.
Figure 6A:
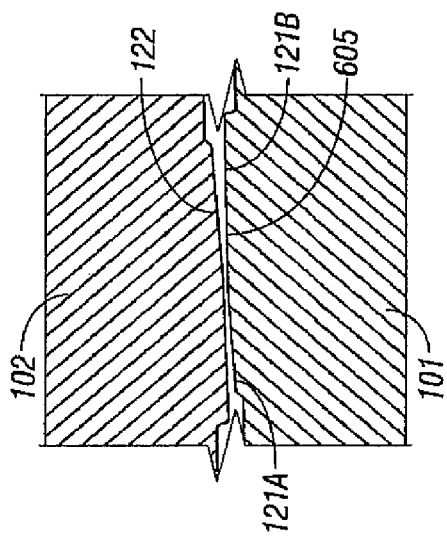
FIG. 6A shows a mid-seal before being radially expanded in accordance with an embodiment of the present invention.

Turning to FIGS. 6A and 6B, another mid-seal in accordance with an embodiment of the present invention is shown. The mid-seal in FIG. 6A includes a pin member 101 with two seal surfaces 121A and 121B, which intersect at sealing line 605. The box member 102 has a seal surface 122, which may be frustoconical. In this particular embodiment, the sealing is designed to occur between sealing line 605 and seal surface 122 when the connection is radially expanded, as shown in FIG. 6B. An advantage of a sealing line 605 is that it provides a narrow circumferential line of contact for the mid-seal. This reduces the contact area, thereby increasing the contact pressure and providing a higher pressure seal. Because the high contact pressure is very localized, the risk of the seal surface 122 radially expanding away from the pin member 101 may be reduced. Further, a narrow line of contact is less dependent on surface finish for sealing than relatively large contact surfaces. Those having ordinary skill in the art will appreciate that sealing line 605 may be rounded or chamfered without departing from the scope of the present invention. Further, in some embodiments, the mid-seal 120 may include two or more sealing lines that form a seal against the seal surface 122.

Figure 7A:
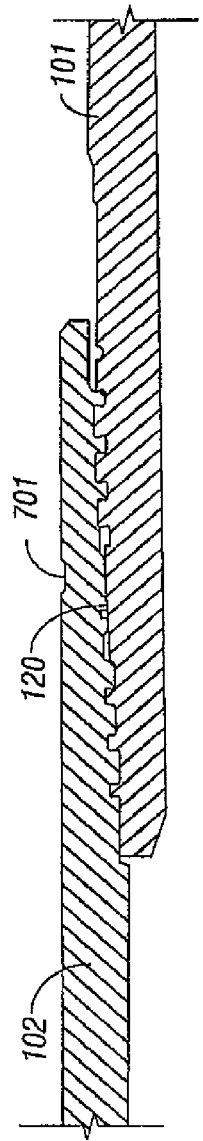
FIG. 7A shows a connection having an expandable mid-seal in accordance with an embodiment of the present invention.

In FIG. 7A, a connection in accordance with an embodiment of the present invention is shown. The connection includes a pin member 101 and a box member 102. The box member 102 includes a strain focusing groove 701, which is located at about the same axial position as mid-seal 120. Strain focusing grooves are disclosed in U.S. Pat. No. 6,607,220 issue to Sivley, IV (hereinafter "Sivley '220"), and assigned to the assignee of the present invention. That patent is incorporated herein by reference in its entirety. Sivley '220 discloses forming strain focusing grooves to focus and/or control strain generated by radial expansion of a connection. As discussed above, increasing the flexibility of the mid-seal area may increase the selected gap. The formation of strain focusing groove 701 on the outer diameter of the box member 102 increases the flexibility of the mid-seal area by locally reducing the wall thickness, which makes the mid-seal area less resistant to residual hoop stresses. As a result of the strain focusing groove 701, the mid-seal area sags more during radial expansion relative to the pin member 101 and the rest of the box member 102.

Figure 7B:
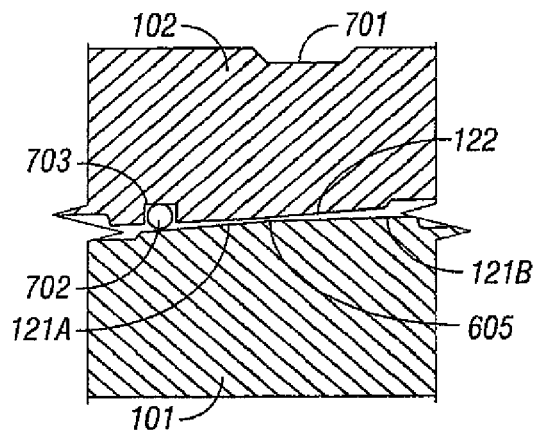
FIG. 7B shows the mid-seal of the connection shown in FIG. 7A before being radially expanded.
Figure 7C:
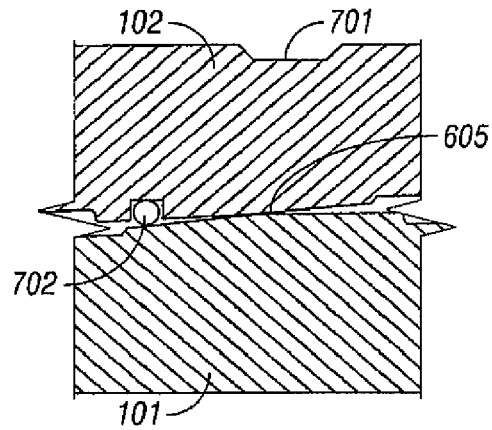
FIG. 7C shows the mid-seal of the connection shown in FIG. 7A after being radially expanded.

Turning to FIG. 7B, a detailed view of mid-seal 120 is shown. In this particular embodiment, the mid-seal 120 includes a sealing element 702, such as an O-ring, disposed in a groove 703 formed in the box member 102. In one embodiment, the groove 703 may be formed in the pin member 101. Sealing element 702 is designed to provide a seal for the connection prior to being radially expanded. In one embodiment, the sealing element 702 may also provide a seal after radial expansion. FIG. 7C shows the mid-seal 120 after being radially expanded. Sealing element 702 is compressed as a result of the closing of the selected gap. Any sealing ability provided by the sealing element 702 would be redundant to that provided by mid-seal 120 between contact line 605 and seal surface 122.

Figure 11:
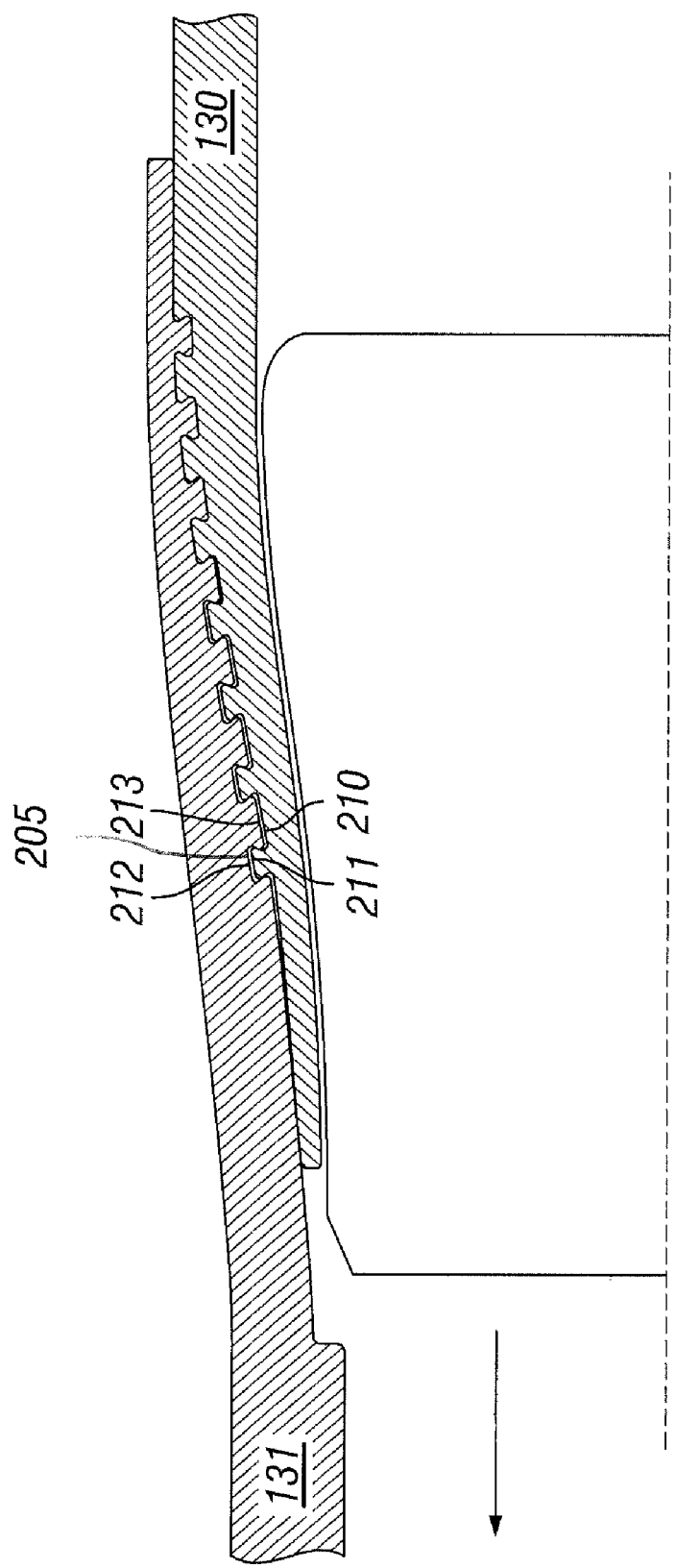
FIG. 11 shows a cross-sectional view of a wedge thread having a selected gap between the roots and crests prior to radial expansion in accordance with an embodiment of the present invention.

In some embodiments, a thread seal may be provided at the selected make-up. In one embodiment, a wedge thread may be used to provide a thread seal. In another embodiment, a thread seal may also be provided after radial expansion of the connection. A radially expandable connection with a thread seal is disclosed in U.S. application Ser. No. 10/973,937 (the "'937 Application") titled "Expandable Threaded Connection," and assigned to the assignee of the present invention. That application is incorporated herein by reference in its entirety. FIG. 11 shows a cross-sectional view of a wedge thread in which a selected gap 205 is provided between the roots 212, 210 and crests 211, 213 in accordance with embodiments of the present disclosure. The gap 205 is selected such that, when the connection is plastically radially expanded by a selected percentage, there is a desired interference between the pin thread crest 211 of pin member 130 and the box thread root 212 of box member 131 forming a thread seal over a portion of the connection.

Figure 9:
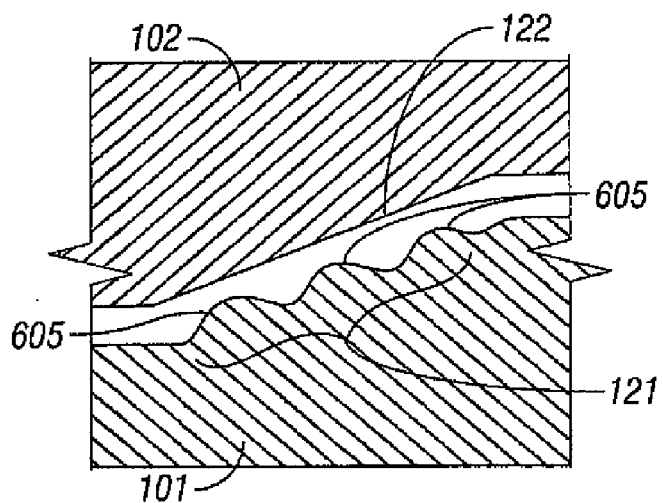
FIG. 9 shows a mid-seal before being radially expanded in accordance with an embodiment of the present invention.

FIG. 9 shows a mid-seal in accordance with another embodiment of the present invention. In this embodiment, the seal surface 121 is undulating along a taper. The seal surface 121 may include three sealing lines 605, which provide narrow circumferential lines of contact with seal surface 122 on the box member 102 when the connection is radially expanded. The embodiment shown in FIG. 9 provides a redundant sealing arrangement. This may be advantageous if damage occurs during the handling of the connection on the surface.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An expandable tubular connection, comprising:
    a pin member comprising a pin wedge thread formed on a small step and a large step;
    a box member comprising a box wedge thread formed on a small step and a large step;
    a first seal surface formed between the small step and the large step of the pin thread;
    a second seal surface formed between the small step and the large step of the box thread;
    wherein, upon selected makeup of the pin member with the box member, a selected gap exists between the first seal surface and the second seal surface.

2. The expandable tubular connection of claim 1, wherein upon plastic radial expansion of the tubular connection, the first and second seal surfaces are configured so that a contact seal is formed therebetween.

3. The expandable tubular connection of claim 1, wherein the small step and the large step of both the pin member and the box member are formed on a single taper.

4. The expandable tubular connection of claim 1, further comprising:
   a gap between a pin thread crest and a box thread root at the selected make-up.

5. The expandable tubular connection of claim 4, wherein the gap between the pin thread crest and the box thread root is configured such that a desired interference is formed therebetween upon plastic radial expansion of the expandable tubular connection.

6. An expandable tubular connection comprising:
   a pin member comprising,
      a pin thread formed on a small step and a large step, and
      a first seal surface formed between the small step and the large step;
   a box member comprising,
      a box thread formed on a small step and a large step, and
      a second seal surface formed between the small step and the large step;
   wherein the pin thread and the box thread are wedge threads,
   a selected gap located between the first seal surface and the second seal surface upon a selected make-up of the pin member with the box member; and
   wherein contact between the first and the second seal surfaces forms a seal after plastic radial expansion of the expandable tubular connection.

7. The expandable tubular connection of claim 6, further comprising a sealing element disposed between the small step and the large step of one of the pin member and the box member, wherein the elastomeric sealing element provides a seal at the selected make-up.

8. The expandable tubular connection of claim 6, wherein the pin thread and the box thread have a trapped thread form.

9. The expandable tubular connection of claim 6, wherein one of the first seal surface and the second seal surface is frustoconical and the other is curved.

10. The expandable tubular connection of claim 6, wherein one of the first seal surface and the second seal surface comprises two surfaces that intersect to form a sealing line.

11. The expandable tubular connection of claim 6, further comprising:
   a gap between a pin thread crest and a box thread root upon selected make-up of the pin member with the box member; and
   wherein the pin thread crest and the box thread root are in contact and form a seal after plastic radial expansion of the expandable tubular connection.

12. The expandable tubular connection of claim 6, wherein one of the first seal surface and the second seal surface is cylindrical.

13. The expandable tubular connection of claim 6, wherein the first seal surface and the second seal surface are frustoconical and have different angles relative to a central axis of the connection.

14. The expandable tubular connection of claim 6, further comprising:
   a strain focusing groove formed on an outer diameter of the box member at an overlapping axial position with the second seal surface.

15. The expandable tubular connection of claim 6, wherein the small step and the large step of both the pin member and the box member are formed on a single taper.

16. The expandable tubular connection of claim 15, wherein the single taper is less than about 10 degrees.

17. The expandable tubular connection of claim 16, wherein the single taper is between about 2 degrees and about 5 degrees.

* * * * *